(12) United States Patent
Herve et al.

(10) Patent No.: US 8,064,966 B2
(45) Date of Patent: Nov. 22, 2011

(54) METHOD OF DETECTING A DOUBLE TALK SITUATION FOR A "HANDS-FREE" TELEPHONE DEVICE

(75) Inventors: Michael Herve, Paris (FR); Alexandre Briot, Paris (FR); Benoit Pochon, Paris (FR)

(73) Assignee: Parrot, Paris (FR)

( * ) Notice: Subject to any disclaimer, the term of this patent is extended or adjusted under 35 U.S.C. 154(b) by 0 days.

(21) Appl. No.: 12/792,363

(22) Filed: Jun. 2, 2010

(65) Prior Publication Data
US 2010/0311471 A1    Dec. 9, 2010

(30) Foreign Application Priority Data
Jun. 9, 2009   (FR) ...................................... 09 53802

(51) Int. Cl.
*H04B 1/38* (2006.01)
*H04M 1/00* (2006.01)
(52) U.S. Cl. ................ 455/570; 455/569.2; 379/388.01; 379/406.05; 379/406.01; 379/387.01; 348/611; 348/607
(58) Field of Classification Search ....... 455/569.1–570, 455/63.1; 379/406.01–406.16, 391–392.01; 348/611, 614, 607
See application file for complete search history.

(56) References Cited

U.S. PATENT DOCUMENTS

| | | | |
|---|---|---|---|
| 6,795,550 B1 | 9/2004 | Chen | |
| 2002/0154761 A1* | 10/2002 | McLaughlin et al. | ... 379/388.01 |
| 2003/0007633 A1 | 1/2003 | Tucker et al. | |
| 2004/0052358 A1* | 3/2004 | Lashley et al. | ........... 379/387.01 |
| 2005/0286714 A1* | 12/2005 | Tokuda | .................... 379/406.05 |
| 2008/0101622 A1 | 5/2008 | Sugiyama | |

* cited by examiner

*Primary Examiner* — Kent Chang
*Assistant Examiner* — Keith Fang
(74) *Attorney, Agent, or Firm* — Haverstock & Owens LLP

(57) ABSTRACT

The device comprises a microphone for detecting a speech signal from a near speaker, and a loudspeaker for reproducing a speech signal from a remote speaker. The processing for canceling the interfering acoustic echo implements an adaptive linear filtering algorithm. Double talk situations are detected by: evaluating an index representative of the convergence or divergence of the algorithm; assessing a predetermined condition for detecting a double talk situation; and if the condition is satisfied, modifying at least one parameter of the algorithm in response to the detection. The representative index may be the norm of the gradient vector describing the adaptation of the filter from one iteration of the algorithm to the next, the conditions being a comparison between the gradient and a threshold. The parameter that is modified double talk situation may be the adaptation stepsize of the algorithm, and also the gain control of an echo suppression stage.

11 Claims, 1 Drawing Sheet

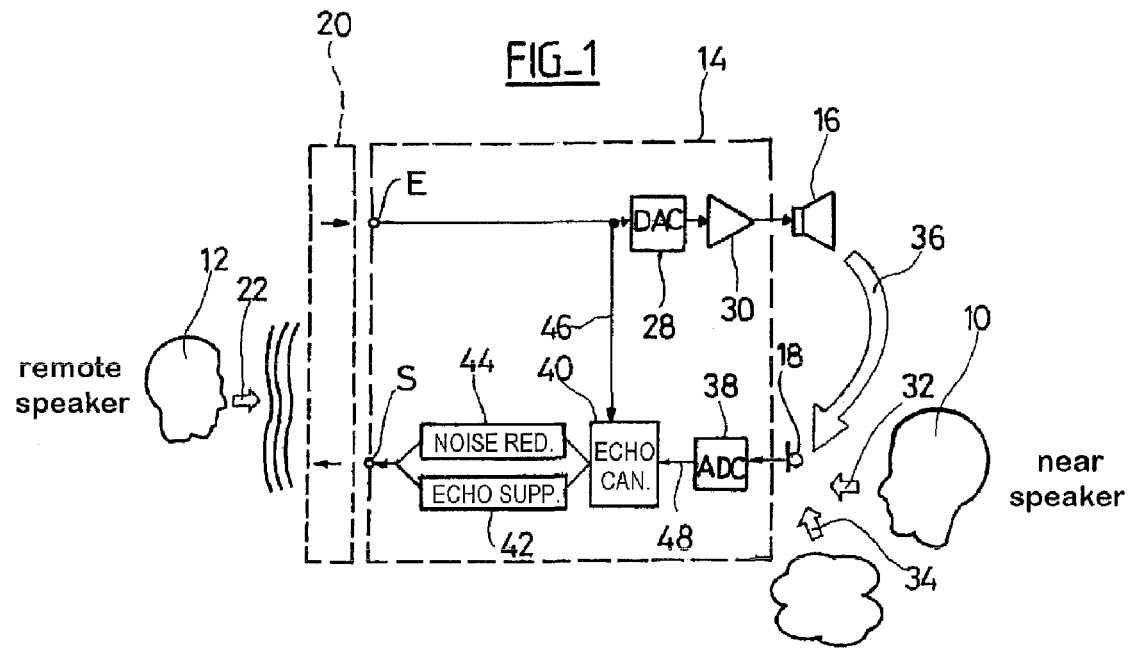
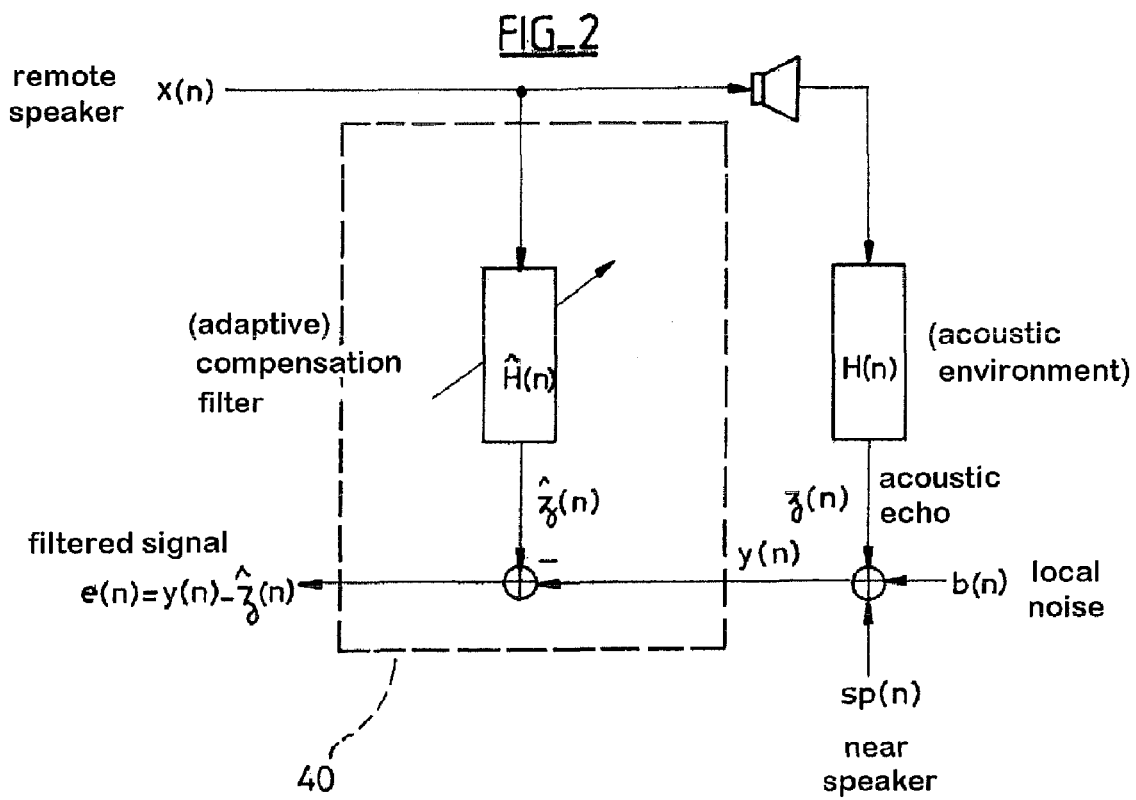

METHOD OF DETECTING A DOUBLE TALK SITUATION FOR A "HANDS-FREE" TELEPHONE DEVICE

FIELD OF THE INVENTION

The invention relates generally to reducing echo in devices that use audio signals picked up by a microphone, e.g. telephones, "hands-free" type adapters, and analogous devices.

In particular, the invention may advantageously be applied to a "hands-free" device suitable for use in association with a mobile telephone, in particular an independent "hands-free" device that is suitable for fitting removably to a motor vehicle.

BACKGROUND OF THE INVENTION

Such a "hands-free" device for a motor vehicle is described by way of example in WO 2008/049982 A1 (Parrot SA) which describes various types of echo cancellation and suppression processing, noise reduction processing, etc., as applied to a signal picked up by a microphone that picks up the acoustic signal from the near speaker.

The echo considered herein—to be distinguished from the "line echo" that arises solely within the transmission path, and for which various filtering methods are known—is the acoustic echo as picked up by the microphone and that is due to the phenomenon of reverberation in the environment of the speaker, typically the room or the vehicle cabin occupied by the speaker, and also to direct acoustic coupling between the loudspeaker and the microphone.

A microphone picks up not only the voice of the near speaker, but also the surrounding noise and, above all, the acoustic echo coming from the sound reproduced by the loudspeaker. The acoustic echo constitutes a major disturbing element of the device that can often be so great as to make the speech of the near speaker (the speaker whose speech is lost in the acoustic echo) incomprehensible for the remote speaker (the speaker at the other end of the transmission path of the telephone signal).

This effect is particularly marked when the microphone and the loudspeaker are close together, and the acoustic power delivered by the loudspeaker is high—as is very often true of systems on board motor vehicles, where the sound level from the loudspeaker is relatively high in order to cover surrounding noise.

Furthermore, numerous "hands-free" devices are implemented in the form of appliances that are self-contained, and removable, comprising a single housing containing both the microphone and the loudspeaker together with control buttons: the proximity (a few centimeters) between the loudspeaker and the microphone then gives rise to a considerable level of acoustic echo, typically of the order of twenty times greater than the speech signal produced by the near speaker.

This effect is manifest essentially during so-called "double talk" situations, i.e. when both speakers are speaking at the same time, because when the remote speaker is speaking the level of the echo that is produced is considerably greater than the mean level of the speech from the near speaker.

Unfortunately, these stages in a call are important since they enhance interactivity between the speakers, and it is important to conserve them (i.e. to maintain so-called "full duplex" communication, as contrasted to alternating or "half-duplex" communication, in which, while one of the speakers is speaking, the other speaker is prevented from intervening.

This double talk situation is very critical for echo cancellation processing (also known as acoustic echo cancellation (AEC)), since it is necessary to estimate dynamically the component that is associated with the acoustic echo and to subtract this estimate from the overall signal picked up by the microphone, but without that degrading the component that is associated with the speech from the near speaker.

In addition, conventional processing in the presence of echo makes use not only of acoustic echo cancellation, but also of post-processing referred to as echo suppression, which applies varying gain to the signal for the purpose of attenuating the residual echo, but does so overall without distinguishing between the residual echo and useful speech, if any is present. As a result, during a period of double talk, this time-varying gain control gives rise simultaneously to a significant degradation in the useful speech.

Various algorithms exist for detecting double talk that make it possible to detect such a situation and to adapt the processing for echo cancellation and for suppressing the residual echo.

Thus, US 2008/0101622 A1 describes echo cancellation processing that implements one or two double talk detectors (DTDs). When two DTDs are used in parallel, an evaluator circuit is provided that delivers a status flag (converged/not converged) concerning the adaptive filter used for the echo cancellation processing. This evaluator circuit is used to control a switch that enables one of the DTDs to take the place of the other once filtering has converged. That flag nevertheless makes no contribution to determining the presence or absence of double talk by either of the DTDs. The convergence status of the adaptive filter is thus without effect on the decision taken by one or the other of the DTDs about the existence or absence of a double talk situation; this status is used only downstream from the double talk detectors, in order to substitute one of the DTDs for the other.

In general, the algorithms that have been proposed in the past for detecting double talk are relatively complex, insofar as they are based on analyzing the spectral envelope of the echo signal. Double talk detection is thus relatively demanding in terms of calculation power, and even then it does not provide a high degree of certainty about the presence of a genuine double talk situation.

OBJECT AND SUMMARY OF THE INVENTION

One of the objects of the invention is to provide a time-varying flag about the presence of double talk that makes it possible to detect periods of double talk effectively, but without implementing complex algorithms, and to do so with effectiveness that is considerably improved compared with the methods that have been proposed in the past.

In the event of a double talk situation being detected, another object of the invention is to optimize the actions taken by the echo cancellation and suppression processing of the device.

Acoustic echo cancellation techniques make use of adaptive filters that model the acoustic coupling between the loudspeaker and the microphone by means of a linear transformation between the signal from the remote speaker (i.e. the signal that is reproduced by the loudspeaker) and the echo that is picked up by the microphone. This transformation dynamically defines an adaptive filter that is applied to the incident signal coming from the remote speaker, and the result of this filtering is subtracted from the signal picked up by the microphone, thereby having the effect of canceling the major portion of the acoustic echo. An example of an adaptive algorithm implementing such processing is described, for example, in FR 2 792 146 A1 (Parrot SA) to which reference may be made for more details. Above-mentioned US 2008/0101622 A1 also implements this type of processing.

In the event of double talk, the drawback is that the speech signal from the near speaker is interpreted by the echo canceller as non-correlated noise that is liable to give rise to defective convergence of the adaptive filter, and more often even to divergence thereof, leading to unsatisfactory cancellation of the echo. In order to avoid this drawback in the event of detecting double talk, the conventional solution consists in freezing the parameters of the adaptive filter in order to prevent it from diverging. However, so long as the double talk situation persists, it then becomes impossible to take any account of slow variations in the acoustic path that may arise during this period.

One of the objects of the invention is to provide a remedy to this difficulty by making it possible, even during periods of double talk, for the adaptive filter to continue taking account of slow variation in the acoustic path from which the echo originates.

The principle on which the invention is based consists in detecting a double talk situation by:

i) observing and acting on behaviors that are characteristic of divergence of the adaptive device, which behaviors are associated with periods of double talk;

ii) deriving a representative index therefrom; and iii) using this index as input data for the double talk detector.

Cancellation of acoustic echo relies on finding a correlation between the signal played back by the loudspeaker and the signal picked up by the microphone, i.e. on estimating the impulse response of the environment of the near speaker (room or vehicle cabin).

During a period of echo alone (no double talk), the algorithm convergences quickly towards the real filter; in contrast, during a period of double talk, the speech signal from the near speaker disturbs the estimation of the impulse response and tends to make the algorithm diverge. Divergence of the filter is then very probably associated with double talk, and detecting such divergence (or erratic behavior) constitutes a criterion that is particularly effective in detecting such a double talk situation.

More precisely, the invention proposes a method of the same general type as that described for example in above-mentioned US 2008/0101622 A1, i.e. a method implemented in a "hands-free" telephone device comprising a microphone for picking up a speech signal from a near speaker, and a loudspeaker for reproducing a speech signal from a remote speaker, the loudspeaker being suitable for giving rise to an interfering acoustic echo by coupling with the microphone. The method comprises, in a manner that is itself known: echo cancellation processing by implementing an adaptive linear filter algorithm, the algorithm being iterated at a given adaptation stepsize; processing for detecting and taking account of a double talk situation; and processing for evaluating an index representative of the degree of convergence or divergence of the adaptive linear filter algorithm.

In a manner characteristic of the invention, the detection and taking account of a double talk situation comprises the steps consisting in: a) assessing whether at least one predetermined condition is satisfied, said condition relating to said index representative of the degree of convergence or divergence of the algorithm, as evaluated; b) deducing that a double talk situation has arisen on the basis of the result of the assessment in step a); and c) in the event of double talk arising, modifying at least one parameter of the adaptive linear filter algorithm, in response to detecting said double talk situation.

In a preferred implementation, the representative index is the norm of the gradient vector describing the adaptation of the adaptive filter from one interaction of the algorithm to the next; and the predetermined condition is a comparison between the gradient and a threshold, in particular a threshold that is dynamically modifiable as a function of the energy level of the signal to be filtered, the double talk situation being detected when the norm of the gradient is less than said threshold.

The parameter that is modified in an established double talk situation may in particular be the adaptation stepsize of the algorithm.

To this end, the invention advantageously provides for iterating the algorithm with: in the absence of double talk, a first stepsize value corresponding to fast adaptation of the filter; and on detection of a double talk situation, a second stepsize value that is not zero and that is different from the first, said value corresponding to slow adaptation of the filter. In the event of double talk being detected, the stepsize value is preferably modified progressively from the first value to the second value.

Advantageously, the algorithm is also iterated with: a specific stepsize value for the processing for detecting a double talk situation, which specific value is different from the stepsize values used for the echo cancellation processing. This specific stepsize value is independent of the presence or absence of a double talk situation, with a value intermediate between the first and second stepsize values.

Another parameter that is modified in an established double talk situation may be controlling the gain of an echo suppression stage, by acting on detection of a double talk situation to switch from a time-varying gain control operating overall on all frequencies, in the absence of double talk, to a frequency-varying gain control operating selectively and differently on frequency bands that are associated mainly with the echo and on frequency bands that are associated mainly with the speech signal from the near speaker.

BRIEF DESCRIPTION OF THE DRAWING

There follows a description of an implementation of the method of the invention with reference to the accompanying drawing in which the same numerical references are used from one figure to another to designate elements that are identical or functionally similar.

FIG. 1 is a general diagram showing the various stages involved in the echo cancellation and suppressing processing of a "hands-free" telephone device.

FIG. 2 is a block diagram showing the parameters implemented by the echo eliminating algorithm of the FIG. 1 device.

MORE DETAILED DESCRIPTION

With reference to FIG. 1, the description begins with the general structure of a "hands-free" device that, in conventional manner, comprise echo cancellation means, echo suppression means, and noise reduction means.

Such a device is designed to convey a telephone conversation between two people, specifically a near speaker 10 and a remote speaker 12. The near speaker 10 is a speaker close to the "hands-free" device 14. The remote speaker 12 is the speaker with whom the near speaker is in telephone conversation.

The device 14 is typically a device installed in a motor vehicle, in permanent or removable manner. It possesses a loudspeaker 16 for reproducing the speech of the remote speaker, and a microphone 18 for picking up the speech of the near speaker 10. The device also includes interface means shown diagrammatically at 20, for both-way transmission of signals over a telephone network, and by way of non-limiting example, a Bluetooth (trademark filed by Bluetooth SIG, Inc.) type wireless interface or some other interface suitable for coupling the device 14 to the mobile cell phone of the near speaker, whereby the near speaker is in radiotelephone conversation with the remote speaker.

The incident signal received at the input E of the device 14, including the speech component 22 from the remote speaker 12, is applied to a digital-to-analog converter 28, and is then input to an audio amplifier 30 that reproduces the signal on the loudspeaker 16.

The microphone 18 picks up an acoustic signal comprising a combination of: i) speech 32 from the near speaker 10; ii) ambient noise 34 that exists in the speaker's environment (e.g. in the cabin of the motor vehicle); and iii) the signal 36 being reproduced by the loudspeaker 16.

The signal 36 constitutes an echo signal that is undesirable from the point of view of the microphone 18. As mentioned above, given the operating levels of the amplifier 30 and the strong coupling due to the closeness of the loudspeaker 16 and the microphone 18, when the remote speaker 12 speaks, then the level of the signal 36 may be as much as twenty times greater than the level of the speech signal 32 from the near speaker 10.

After the signal from the microphone 18 has been digitized via the analog-to-digital converter stage 38, the acoustic echo is reduced by means of three processes in succession: i) echo cancellation 40; ii) echo suppression 42; and iii) noise reduction 44. These processes are implemented in the form of suitable algorithms executed by a microcontroller or a signal processor incorporated in the device 14. Although for clarity of explanation, these processes are described in the form of distinct modules, they implement elements in common and, in fact, they correspond to a plurality of functions that are all executed by the same software.

The echo cancellation module 40 has essentially no effect on the speech from the near speaker 10: the voice of the near speaker is thus intact after echo cancellation 40. Echo cancellation consists in dynamically defining a compensation filter that receives as input a reference signal 46 coming from the remote speaker (signal at the input E of the device) so as to produce an adapted signal that is representative of the received signal and that is subtracted from the signal 48 that is picked up by the microphone 18 in order to output a signal that is free of the interfering echo. This processing is explained in greater detail below, with reference to FIG. 2.

The echo suppression module 42 is located at the outlet from the echo cancellation module 40 and it attenuates the audible residual echo that remains down to the level of the noise, where such a residual echo may remain for various reasons such as: imperfect filter adaptation, linear modeling that is approximate, the presence of non-linearities, etc.

Finally, the noise reduction module 44 serves to reduce the background noise 34 picked up by the microphone, while preserving the speech 32 from the near speaker.

The signal as processed in this way, with echo and noise removed, is finally delivered to the output S of the device for transmitting to the remote signal via the interface 20.

Principle on which the Acoustic Echo is Canceled

Acoustic echo cancellation relies on determining a finite impulse response (FIR) filter that models the (unknown) real impulse response of the linear portion of the acoustic and mechanical coupling between the loudspeaker and the microphone, and of a length that depends on the configuration of the environment and on the sampling frequency.

As shown diagrammatically in FIG. 2, the principle of echo cancellation (module referenced 40) consists in making the best possible estimate of the filter H that models all of the elements that contribute to producing the echo, with this being done by means of a compensation filter $\hat{H}$ that is updated by adaptive methods and that serves to generate a pseudo-echo or estimated echo $\hat{z}(n)$:

$$\hat{z}(n) = x(n) * \hat{H}(n)$$

where n represents the current sample number, x(n) represents the loudspeaker signal (the speech signal coming from the remote speaker), and * represents the convolution product.

The estimated echo $\hat{z}(n)$ is subtracted from the signal y(n) as picked up by the microphone, this picked-up signal itself being the sum of the speech signal sp(n) from the local speaker plus the local noise b(n) plus the (assumed linear) acoustic echo z(n). The resulting signal is the filtered signal or error signal that is written e(n).

Various algorithms may be implemented to achieve dynamic adaptation of the compensation filter $\hat{H}$.

Certain methods make use of a least mean square (LMS) type algorithm or of a normalized LMS (NLMS) type algorithm, which is a normalized version of the LMS algorithm. These algorithms are relatively simple and undemanding in terms of calculation resources, and they rely on minimizing the power of the error, which problem may be summarized as solving the deterministic gradient adaptation equation:

$$\hat{H}(n) = \hat{H}(n-1) + \mu \cdot E\{e(n-1) \cdot X(n)\}$$

$\hat{H}(n) = [\hat{h}_0, \hat{h}_1, \hat{h}_{L-1}]$ being the adaptive filter of length L; $X(n) = [x(n), x(n-1), \ldots x(n-L+1)]^T$ being the vector of the L most recent samples presented to the loudspeaker; and $\mu$ being a factor, referred to as the adaptation stepsize, that controls the speed of convergence.

The LMS or stochastic gradient is an approximation to the deterministic gradient, where the mathematical expectation is replaced by the instantaneous data, giving:

$$\hat{H}(n) = \hat{H}(n-1) + \mu \cdot e(n-1) \cdot X(n)$$

With an NLMS algorithm, and after being normalized, this expression becomes:

$$\hat{H}(n) = \hat{H}(n-1) + \mu \cdot \frac{e(n-1) \cdot X(n)}{X^T(n) X(n)}$$

In the context of the invention, it is nevertheless preferred to use an algorithm of the affine projection algorithm (APA) type, in particular an adaptive APA such as that described in above-mentioned FR 2 792 146 A1.

The strong point of APAs is their fast convergence, and in this respect they constitute a major advance compared with LMS or NLMS type echo suppression algorithms, which sometimes require several seconds in order to stabilize, making them poorly adapted to "hands-free" type applications with voice delivery that is intermittent and at a level that can vary quickly.

The APA is a generalization of the NLMS algorithm, based on the principle of minimizing, not the current error e, but rather the error vector E. The equations that describe the behavior of this algorithm for updating the coefficients of the filter are the following:

$$X(n) = [x(n), x(n-1), \ldots, x(n-L+1)]^T$$

$$mX(n) = [X(n), X(n-1), \ldots, X(n-P+1)]$$

$$E(n) = [e(n), e(n-1), \ldots, e(n-P+1)]^T$$

X being the vector of the L most recent samples (L being the size of the filter); mX being the matrix of the P most recent vectors X (P being the order of the affine projection); and E being the vector of the P most recent error values. The adaptation equation for such a filter is:

$$\hat{H}(n+1)=\hat{H}(n)+\mu mX(n)[mX(n)^T mX(n)]^{-1}E(n)=\hat{H}(n)+\mu \cdot g$$

µ being the stepsize of the algorithm and g being the gradient.

The expression for the stepsize µ is as follows:

$$\mu(n) = \frac{2\rho \cdot s_y}{a \cdot \rho \cdot s_y + s_e}$$

a and π being parameters selected to set the maximum adaptation stepsize (e.g. a=4 and π=2); and $s_y$ and $s_e$ respectively representing the smoothed powers of the microphone signal and of the error.

Detecting Double Talk

The first object of the invention is to evaluate an index or criterion that is representative of the degree of convergence or divergence of the algorithm, in order to deduce therefrom that a double talk situation has arisen and thus define time intervals during which this situation prevails.

From the equations set out above for describing the behavior of the algorithm for updating the coefficients of the filter, it is possible to demonstrate characteristic behaviors of divergence that are associated with periods of double talk.

It is possible in particular to observe the activity of the gradient vector g in order to detect these regions of double talk.

The representative index may be a mean of the autocorrelation of the instantaneous estimates of the gradient vector, i.e. a mean of the Euclidean norm $\xi=\|g\|$ of these estimates.

Outside periods of double talk, when the adaptive filter has converged towards the real filter, this index approaches a minimum, indicative of an absence of gradient vector activity, corresponding to the coefficients of the filter varying slowly.

In contrast, the presence of a speech signal coming from the near speaker has a strong impact on the adaptation of the filter, and gives rise to an increase of the gradient, with the consequence of the filter coefficients moving over a large zone around the ideal filter, without any preferred direction.

Comparing the parameter $\xi$ with a given threshold thus makes it possible to distinguish between the two above-mentioned situations: double talk or else echo alone.

The decision is taken by comparing $\xi$ with a threshold: if $\xi$ is greater than the threshold, then the device considers that it is in the presence of a double talk situation, and otherwise that it is in the presence of an echo alone situation.

The detection threshold is determined and may be adapted as a function of conditions representative of conventional use in the environment, in particular as a function of the signal/echo ratio and possibly of the signal/noise ratio. The value of the detection threshold may be in particular be modified dynamically as a function of the energy levels of the echo and useful speech signals at a given instant.

Furthermore, in order to avoid false detections due to irregularities in the signals (threshold exceeded for a very short period), it is desirable to smooth the parameter over time, while nevertheless taking care not to introduce too long a delay in the processing, since that would lead to double talk being detected late and to a return to a below-threshold value, i.e. longer rise and fall times for the representative index.

Modification of the Adaptation Stepsize on Detecting Double Talk

In addition to the accuracy with which double talk is detected, another important point is to know what echo cancellation processing is to be performed in a double talk situation, in particular to determine whether or not it is appropriate to stop adapting a filter.

Conventional devices have the effect of freezing the coefficients of the filter during double talk so as to avoid the filter becoming wrongly adapted as a result of the components of the useful speech that are mixed in with the estimated echo. As a result, it is no longer possible to take account of slow variations in the acoustic path throughout the duration of the double talk period.

In the event of double talk, the invention proposes continuing to adapt the filter, but to do so at a slower speed of adaptation, and to do this by modulating the stepsize.

In characteristic manner, the algorithm may be executed with three distinct stepsize values µ:

a large stepsize value (e.g. µ=0.9) used for periods of echo alone, for calculating the coefficients of the filter with high speed adaptation;

a small value (e.g. µ=0.01) used during periods of double talk in order to calculate the new filter while adapting slowly (the terms "fast" and "slow" should be understood in relative manner); this low value provides a compromise making it possible to avoid any rapid wrong adaptation due to the presence of speech that is not correlated to the loudspeaker channel, while nevertheless making it possible to track slow variations in the acoustic path; and finally an intermediate value (e.g. µ=0.2) used continuously to update the value of the gradient vector g, this value being the same both in periods of double talk and in periods of echo alone.

By having two different stepsizes, respectively for an echo alone situation and for a double talk situation, it is possible to adapt the processing to the detected situation.

Furthermore, the fact of using a constant intermediate value for evaluating the representative index, and thus for detecting the double talk situation, presents the advantage that a detection error does not have any influence on the future behavior of the system.

Specifically, selecting the triplet of values {0.01, 0.2, 0.9} for the three values of the parameter µ makes it possible to attenuate echo by more than 25 decibels (dB) in an echo alone situation, and by less than 3 dB in a double talk situation, by using the echo cancellation module on its own (module 40), i.e. ignoring echo suppression post-processing (by the module 42).

Preferably, in order to avoid changes that are too sudden in the values of the stepsize µ, the changeover from one value to another is not discontinuous. For example, it is possible to increase or decrease the adaptation stepsize from one value to the other in increments of 0.005 per sample.

Instead of executing the algorithm with constant, predetermined stepsize values (the above-described triplet of values), a variant implementation consists in using a stepsize that is continuously variable, as with the method set out in above-mentioned FR 2 792 146 A1.

With this technique, the stepsize µ is variable in continuous manner as a function of the energy levels in the signal picked up by the microphone, before and after filtering. This stepsize increases when the energy of the signal as picked up is dominated by the energy of the echo, and conversely it decreases when the energy of the signal as picked up is dominated by the energy of the background noise and/or of the speech from the remote speaker.

As indicated above, this adaptive variable stepsize may be expressed as follows:

$$\mu(n) = \frac{2\rho \cdot s_y}{a \cdot \rho \cdot s_y + s_e}$$

a and π being parameters that are selected to set the maximum adaptation stepsize (e.g. a=4 and π=2); and $s_y$ and $s_e$ represent respectively the smoothed powers of the microphone signal and of the error.

It is then appropriate to set the parameters a and π in a manner that is appropriate to processing double talk so that the following apply:
- a maximum value for echo alone (when the error is low);
- a zero value with useful speech alone; and
- a value that tends towards zero during double talk.

Controlling the Gain of the Echo Suppressor on Detecting Double Talk

In the echo alone situation, the device applies conventional gain control (echo suppression module 42), which detects all frequency components without distinction.

When a double talk situation is detected (on the basis of the binary time indicator of double talk being present/absent, as described above), and in a manner characteristic of the invention, overall time-varying gain control is deactivated selectively throughout the duration of the period of double talk and instead specific frequency-varying gain control is applied.

This frequency-varying gain control advantageously reproduces the principle set out in WO 2008/049982 A1 (Parrot SA) which proposes calculating a gain for each frequency band and for each frame (instead of overall over the entire band of frequencies), as a function of respective values for the residual echo power in each of the frequency bands. For each frequency band, the device evaluates the value of the echo return loss enhancement (ERLE), which parameter is conventionally used in echo suppression methods:

$$ERLE(n) = 10 * \log 10 \left( \frac{\overline{e^2(n)}}{\overline{y^2(n)}} \right)$$

$\overline{e^2(n)}$ and $\overline{y^2(n)}$ being the mean values of $e^2(n)$ and of $y^2(n)$.

Thus, for a given frequency component, if the observed ERLE is large, then the energy associated with that frequency is very likely to be a contribution from the echo, and a high level of attenuation is applied at that frequency. In contrast, if the frequency ERLE is low, then it is very probable that it is near speech that is present, so no attenuation is applied. This makes it possible to process the frequency bands associated with the echo differently from those in which energy is associated mainly with near speech, thereby avoiding degrading the useful speech.

What is claimed is:

1. A method of processing an audio signal in a "hands-free" telephone device, in particular a self-contained device that is suitable for being fitted removably in a motor vehicle, the device including a microphone for picking up a speech signal from a near speaker, and a loudspeaker for reproducing a speech signal from a remote speaker, the loudspeaker being suitable for giving rise to an interfering acoustic echo by coupling with the microphone, said audio signal processing method comprising:
   echo cancellation processing by implementing an adaptive linear filter algorithm, the algorithm being iterated at a given adaptation stepsize;
   processing for detecting and taking account of a double talk situation; and
   processing for evaluating an index representative of the degree of convergence or divergence of the adaptive linear filter algorithm;
   wherein said processing for detecting and taking account of a double talk situation comprises the steps consisting in:
   a) assessing whether at least one predetermined condition is satisfied, said condition relating to said index representative of the degree of convergence or divergence of the algorithm, as evaluated;
   b) deducing that a double talk situation has arisen on the basis of the result of the assessment in step a); and
   c) in the event of double talk arising, modifying at least one parameter of the adaptive linear filter algorithm, in response to detecting said double talk situation.

2. The method of claim 1, wherein:
   the representative index is the norm of the gradient vector describing the adaptation of the adaptive filter from one interaction of the algorithm to the next; and
   the predetermined condition is a comparison between the gradient and a threshold, with the double talk situation being detected when the norm of the gradient is less than said threshold.

3. The method of claim 2, wherein the threshold is a threshold that is dynamically modifiable as a function of the energy level of the signal to be filtered.

4. The method of claim 1, wherein said at least one modified parameter is the adaptation stepsize of the algorithm.

5. The method of claim 4, wherein the algorithm is iterated with:
   in the absence of double talk, a first stepsize value corresponding to fast adaptation of the filter; and
   on detection of a double talk situation, a second stepsize value that is not zero and that is different from the first, said value corresponding to slow adaptation of the filter.

6. The method of claim 5, wherein, in the event of double talk being detected, the stepsize value is modified progressively from the first value to the second value.

7. The method of claim 5, wherein the algorithm is also iterated with:
   a specific stepsize value for the processing for detecting a double talk situation, which specific value is different from the stepsize values used for the echo cancellation processing.

8. The method of claim 7, wherein the specific stepsize value is a value that is independent of the presence or absence of a double talk situation.

9. The method of claim 7, wherein the specific stepsize value is a value intermediate between the first and second stepsize values.

10. The method of claim 1, wherein said at least one modified parameter is a gain control parameter for an echo suppression stage.

11. The method of claim 10, wherein the parameter is a parameter that, on detecting a double talk situation, modifies the gain control:
   from a time-varying gain control operating overall on all frequencies, in the absence of double talk; to
   a frequency-varying gain control operating selectively and differently on frequency bands that are associated mainly with the echo and on frequency bands that are associated mainly with the speech signal from the near speaker.

* * * * *